(12) United States Patent
Ogram

(10) Patent No.: US 12,056,972 B2
(45) Date of Patent: Aug. 6, 2024

(54) CONTROLLED INGRESS AND EGRESS DOORWAY

(71) Applicant: Mark Ogram, Tucson, AZ (US)

(72) Inventor: Mark Ogram, Tucson, AZ (US)

( * ) Notice: Subject to any disclaimer, the term of this patent is extended or adjusted under 35 U.S.C. 154(b) by 200 days.

(21) Appl. No.: 17/803,725

(22) Filed: Oct. 28, 2022

(65) Prior Publication Data

US 2023/0120762 A1    Apr. 20, 2023

Related U.S. Application Data

(63) Continuation-in-part of application No. 17/803,660, filed on Sep. 26, 2022, which is a continuation of application No. 17/300,555, filed on Aug. 16, 2021, now Pat. No. 11,521,447.

(51) Int. Cl.
*G07C 9/20* (2020.01)
*G06K 19/06* (2006.01)
*G06V 40/16* (2022.01)
*G07C 9/00* (2020.01)

(52) U.S. Cl.
CPC ......... *G07C 9/20* (2020.01); *G06K 19/06028* (2013.01); *G06V 40/172* (2022.01); *G07C 9/00563* (2013.01)

(58) Field of Classification Search
None
See application file for complete search history.

(56) References Cited

U.S. PATENT DOCUMENTS

| | | | |
|---|---|---|---|
| 6,505,774 B1 | 1/2003 | Fulcher | |
| 7,010,501 B1 | 3/2006 | Roslak | |
| 7,918,191 B2 | 4/2011 | Gibson | |
| 10,600,513 B2 | 3/2020 | Gitchell | |
| 10,803,432 B1 | 10/2020 | Miles | |
| 10,837,225 B2 | 11/2020 | Lammes | |
| 11,036,948 B2 | 6/2021 | Lei | |
| 11,062,103 B2 | 7/2021 | Zhao | |
| 11,068,697 B2 | 7/2021 | Liu | |
| 11,068,762 B2 | 7/2021 | Goldstein | |
| 11,074,431 B2 | 7/2021 | Yamada | |
| 11,401,747 B2 | 8/2022 | Romero | |
| 11,446,510 B2 | 10/2022 | Von Ryberg | |
| 2006/0032977 A1* | 2/2006 | Simmons | B64C 1/1469 244/118.5 |
| 2006/0072787 A1 | 4/2006 | Claudatos | |
| 2011/0233274 A1 | 9/2011 | Flanagan | |
| 2013/0038423 A1 | 2/2013 | Pincue | |
| 2021/0097261 A1 | 4/2021 | Kapinos | |
| 2021/0144956 A1 | 5/2021 | Buchannon | |
| 2021/0039806 A1 | 12/2021 | Duke | |

* cited by examiner

*Primary Examiner* — Carlos Garcia
(74) *Attorney, Agent, or Firm* — Mark Ogram

(57) ABSTRACT

An ingress and egress revolving doorway for a retail store utilizing an entry camera to perform facial recognition of an occupant of the revolving doorway to determine if entry is permitted. The revolving doorway, in one embodiment, is structured to "sweep" the blades of the released blades into a configuration so that an unobstructed egress from the store is assured during a fire situation.

17 Claims, 5 Drawing Sheets

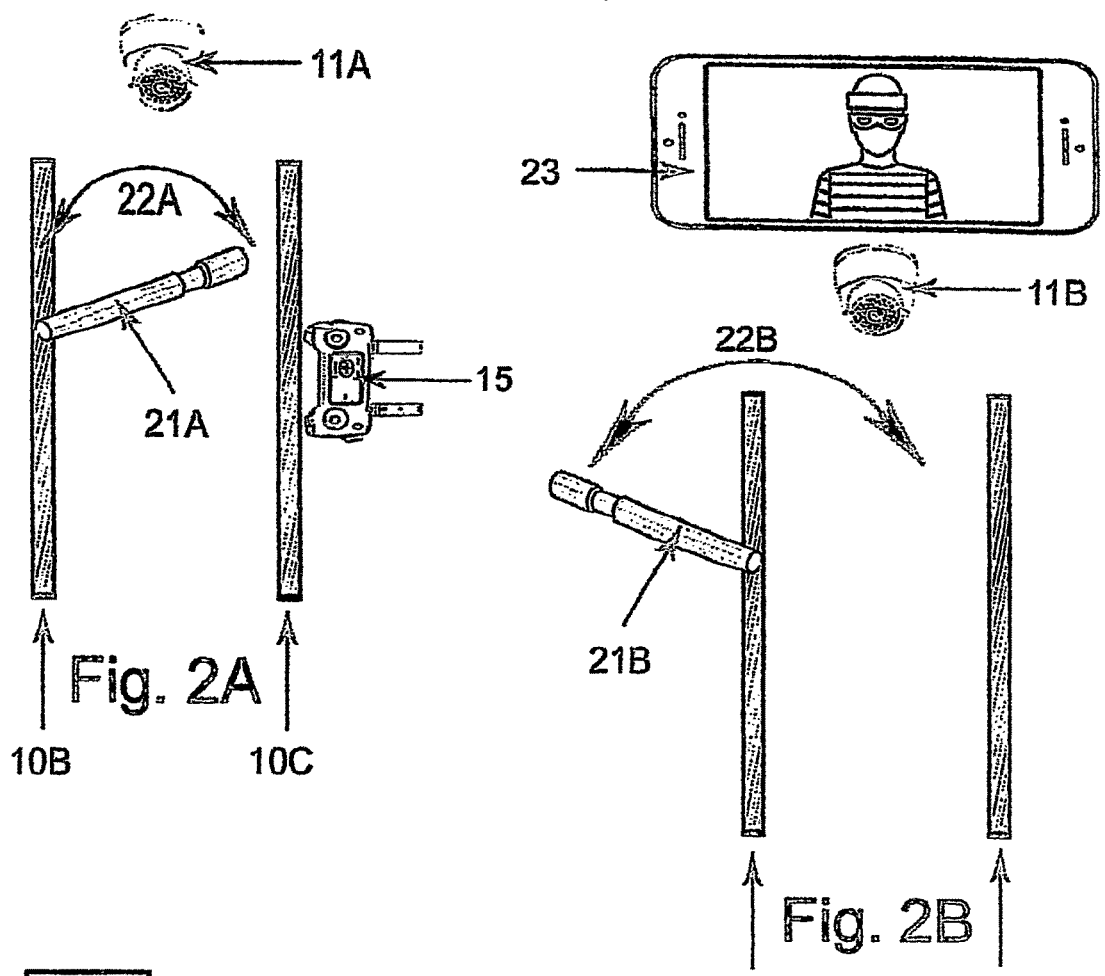
Fig. 2A
Fig. 2B
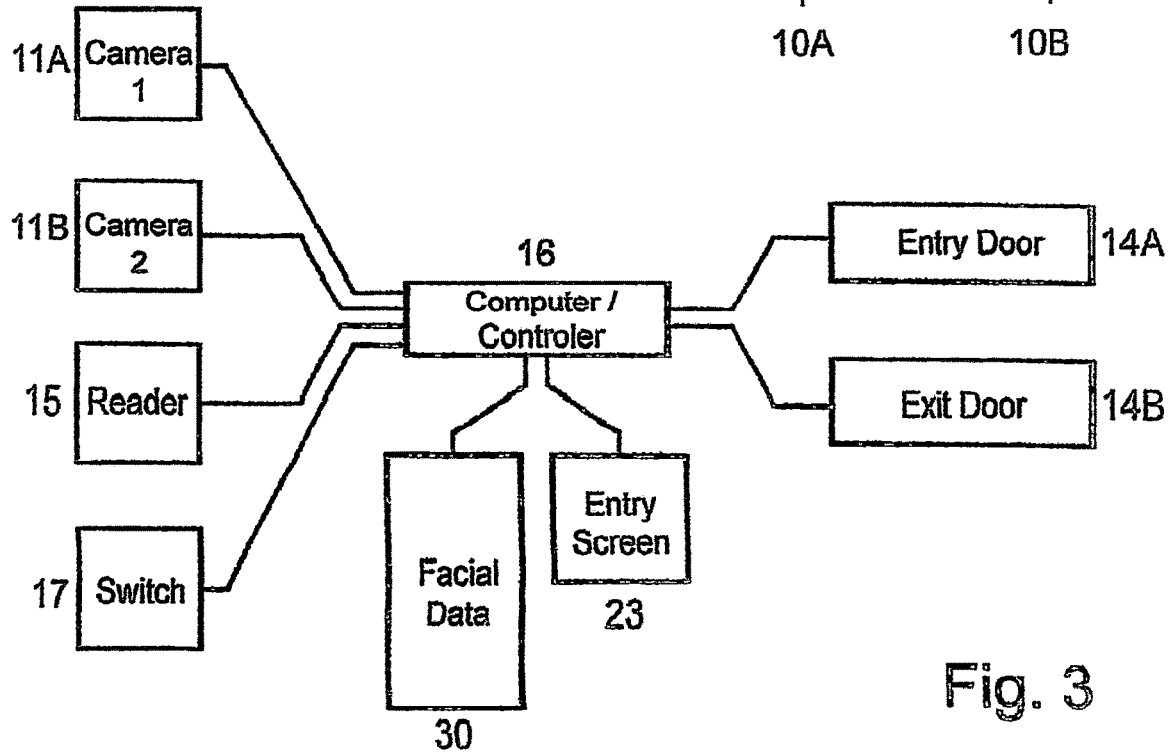
Fig. 3

1414CF

CONTROLLED INGRESS AND EGRESS DOORWAY

PRIORITY

This is a continuation-in-part of U.S. patent application Ser. No. 17/803,660, entitled "Controlled Doorway Systems" filed on Sep. 26, 2022; which was a continuation of U.S. patent application Ser. No. 17/300,555, filed on Aug. 16, 2021, and entitled "Anti-Shoplifting System".

BACKGROUND OF THE INVENTION

This invention relates generally to anti-theft mechanisms and more specifically to anti-shoplifting.

Store security has always been a priority for any retail outlet. Thefts of goods has taken many forms including the simple slipping the item into a purse, wearing the garment from the store, to grab and run with the item. As shoplifting of stores increases, the business has no alternative but to raise the prices on the goods sold to legitimate purchasers to compensate.

While historically, the shoplifting has been relatively minor in scope, a more modern problem has arisen in which groups of individuals enter the store, take what they want and either run, or in some situations, stroll out of the store.

Shopkeepers have very few options available, to confront the thieves invites violence which has resulted in the death of the shop keeper. The only real solution for the shopkeeper is to simply let the shoplifter leave the store.

This though invites further brazen thefts when the thieves know that the shopkeeper will do nothing to curtail their criminal activity.

It is clear there is a need to provide further security from shoplifting.

SUMMARY OF THE INVENTION

The invention utilizes an existing cash register for a retail store that, in processing the purchases, establishes an identifier (such as a date stamp, barcode, QR code) on the receipt. In the invention, this code/identifier is used at an exit portal to trigger the opening of a barrier allowing the purchaser to leave the building. In the preferred embodiment, an image of the customer is taken on entering and leaving the building and facial recognition is made for the purpose, in the case of a successful shoplifting, for later apprehension or for future denial of entry into the store.

The preferred embodiment of the invention uses a register commonly found in retail stores. The register is configured to process a purchase for checkout and to print a receipt of the purchases. In the present invention the receipt includes an identifier such as a date label, a bar code, or a QR code in either visible or invisible ink. When the customer approaches an exit portal, there is a primary barrier (such as an arm or a door) which prevents exit until opened. A scanner is positioned for the customer to use the receipt's identifier to selectively remove/open the primary barrier so that the customer may exit the building.

The use of gates or barriers is well known in the art and include that described in U.S. Pat. No. 7,918,191, entitled "Remotely Operable Gated Chute for Livestock" issued to Gibson on Apr. 5, 2011, and incorporated hereinto by reference.

As noted, a variety of identifiers or codes may be used in this context, including, but not limited to printed date, bar code, and QR codes. Ideally, these identifiers are unique to the date of the purchase and, further, are ideally unique to the particular receipt so that they can be used only once by the customer. To add further security, in one embodiment of the invention, the identifier is printed using an ink that is invisible to the human eye.

The reading of printed material is well known and includes: U.S. Pat. No. 4,262,589, entitled "Apparatus for Embossing and Printing Information on Charge Sales Slip" issued to Gebhardt on Apr. 21, 1981; and U.S. Pat. No. 5,602,936, entitled "Method of and Apparatus for Document Data Recapture" issued to Green et al. on Feb. 11, 1997; both of which are incorporated hereinto by reference.

The use of invisible ink and the like is well known in the art and includes U.S. Pat. No. 10,600,513, entitled "Medication Tracking" issued to Gitchell et al. on Mar. 24, 2020, incorporated hereinto by reference.

Bar code readers are well known to those of ordinary skill in the art and are described in such patents as: U.S. Pat. No. 11,036,948, entitled "Barcode-Scanning System Configured for both Data Validation and Data Formatting" issued to Lei et al. on Jun. 15, 2021; and U.S. Pat. No. 11,062,103, entitled "Digital Barcode Reader" issued to Zhao, et al. on Jul. 13, 2021; both of which are incorporated hereinto by reference.

QR code are an alternative to the barcode and are well known. An example include: U.S. Pat. No. 11,068,762, entitled "Dual Code Authentication Process" issued to Goldstein et al. on Jul. 20, 2021; incorporated hereinto by reference.

The preferred embodiment of the invention incorporates the use of a camera to generate an image of the incoming customer. Positioning of the camera is ideally made below a customer's face so that the full facial image is obtained and cannot be readily blocked by a hat.

This image is stored by the store and ideally a facial recognition is performed on the image.

The field and technology used in facial recognition is well known and includes: U.S. Pat. No. 11,068,697, entitled "Methods and Apparatus for Video-based Facial Recognition, electronic devices, and Storage Media" issued to Liu et al. on Jul. 20, 2021; and U.S. Pat. No. 11,074,431, entitled "Facial Recognition Device" issued to Yamada on Jul. 27, 2021; both of which are incorporated hereinto by reference.

In some embodiments, the exit portal is equipped with a secondary door which may be selectively closed behind the customer to confine the customer until law enforcement arrives. This is done when the customer attempts to shoplift items from the store.

While the exit portal is important to keep shoplifters from illegally removing goods, another aspect of this invention is the use of an entry portal as well. The entry portal is used to "screen" incoming customers to avoid allowing previous shoplifters from re-entering the store or even for denying entry to individuals who have used fraudulent credit cards or checks.

In this context, the entry portal uses a barrier to restrict free access into the store and an entry camera directed to an occupant of the entry portal and generating an electronic image thereof. A recording mechanism stores the image, facial recognition is performed and compared to a library of "undesirables". If the individual is one of the "undesirables", a message on a screen advises the individual: PLEASE TAKE YOUR BUSINESS ELSEWHERE.

The screen is also useful to direct the individual to raise their hat or face so that proper facial recognition may be made.

If no problems are encountered, the barrier is removed allowing access to the interior of the store.

In this manner, the system employs a data base of selected facial data points stored on a memory device allowing the facial recognition system to compare the current image against the data base of selected facial data points, and, maintain the entry barrier in a closed position ifa match occurs between the current image and one of the selected facial data points for "undesirable" individuals.

For safety reasons, an override switch is located proximate to the register. This override switch opens the primary barrier of the exit portal and the primary barrier of the entry portal so that people may leave the building without hinderance. The override switch is also activated by the fire alarm.

In one embodiment of the invention, the entry portal and the exit portal are unified into a single unit and are supported by wheels. This allows, together with an anchoring mechanism, to move the entry/exit unified body through an opening of the store when the store is open for business and to withdraw the entry/exit unified body when the store is closed to business. The opening in the wall is then be sealed using a variety of techniques including the use of a rolling door. The anchor mechanism, for the unified unit, ideally engages with the floor of the store.

One embodiment of the invention creates an ingress and egress revolving doorway for a retail store. This embodiment utilizes an entry camera to perform facial recognition of an occupant (or a to-be occupant) of the revolving doorway to determine if entry is permitted.

The revolving doorway, in one embodiment, is structured to "sweep" the blades into a configuration so that an unobstructed egress from the store is assured during a fire situation.

Revolving doors are well known in the art and include, but not limited to, those described in U.S. Pat. No. 11,466,510, entitled "Seal With Rat Resistant Barrier" issued to Von Ryberg et al al, on Oct. 11, 2022; U.S. Pat. No. 11,401,747, entitled Motor Assisted Revolving Door System and Method with Multiple Sensors" issued to Romero on Aug. 2, 2022; and, U.S. Pat. No. 10,837,225, entitled "Revolving Door" issued to Lammes et al. on Nov. 17, 2020; all of which are incorporated hereinto by reference.

The revolving door creates an ingress/egress for the retail store. Utilizing an interior barrier which is selectively slid over the internal side of the revolving door, the controller is able to control who does, and who doesn't have access to the retail store. Further, using a locking mechanism, the controller of the revolving door is able to "lock" the revolving door in one position to prevent entry.

Using an entry camera directed to an occupant (either within the revolving door or approaching the revolving door), facial recognition data is obtained and compared to a data base of "unwanted" customers (e.g. those have posted bad checks, have robbed the store, or are generally considered undesirable). With this knowledge (accept/reject), the controller is able to adjust the interior barrier.

In some embodiments, an exterior door is also utilized which ideally is closed when the store is not open for business or as another barrier to entry.

Ideally, the theft alarm mechanism is activated at the sound of breaking glass (i.e. a "smash and grab" type of robbery). This theft alarm is identified by the controller to "seal" the retail store by locking preferably locking the revolving door, closing the interior door, and closing the exterior door. Using an emergency vehicle sensor, the controller identifies when an emergency vehicle (i.e. a police car) is proximate and then "opens" the revolving door.

To further dissuade the thief, a strobing light mechanism, responsive to the theft signal, is directed towards an interior of revolving doorway to further hinder escape.

In the preferred revolving door, the basic structure of a central spine; being driven by a motor is used. From the spine, extends multiple blades (forming the "doors"). In the preferred revolving door, at least one blade is rigidly affixed to the spine, the other blades are dis-engageable from the spine. During a fire alarm, to assist with evacuation of the retail store. The dis-engageable blade(s) are disengaged form the spine and the rigidly affixed blade(s) "sweeps" the dis-engageable blades away from the passage to recreate an unobstructed exit passage through the revolving door.

The invention, together with various embodiments thereof, will be explained in detail by the accompanying drawings and the following description thereof.

DRAWINGS IN BRIEF

FIGS. 2A and 2B are horizontal views of the entry and exit portals.

FIG. 3 is an informational flow diagram of the preferred embodiment of the invention.

Figures 6A, 6B, 6C:
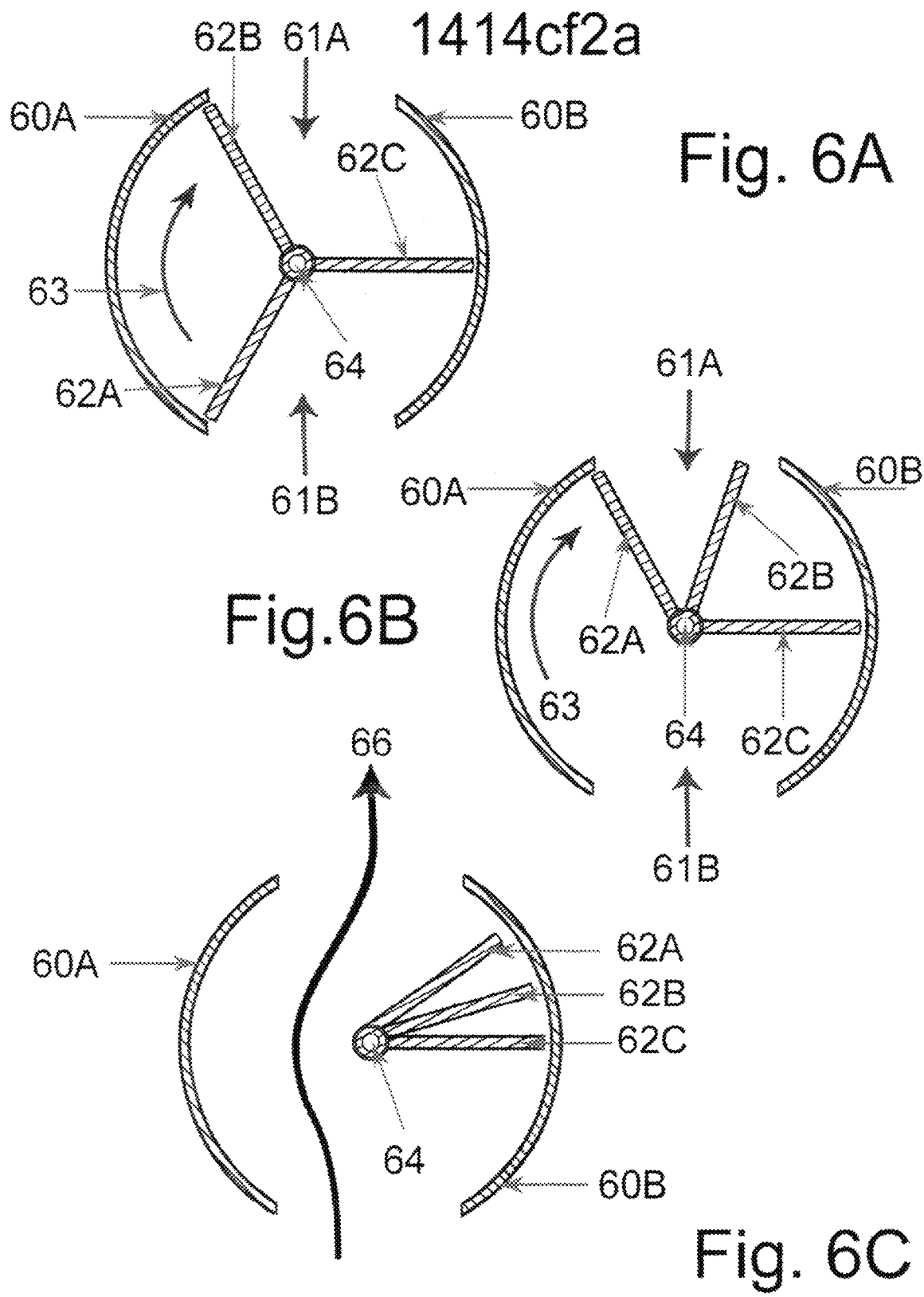

FIGS. 6A, 6B, and 6C illustrate the preferred embodiment of the collapsing revolving door.

DRAWINGS IN DETAIL

Figure 1:
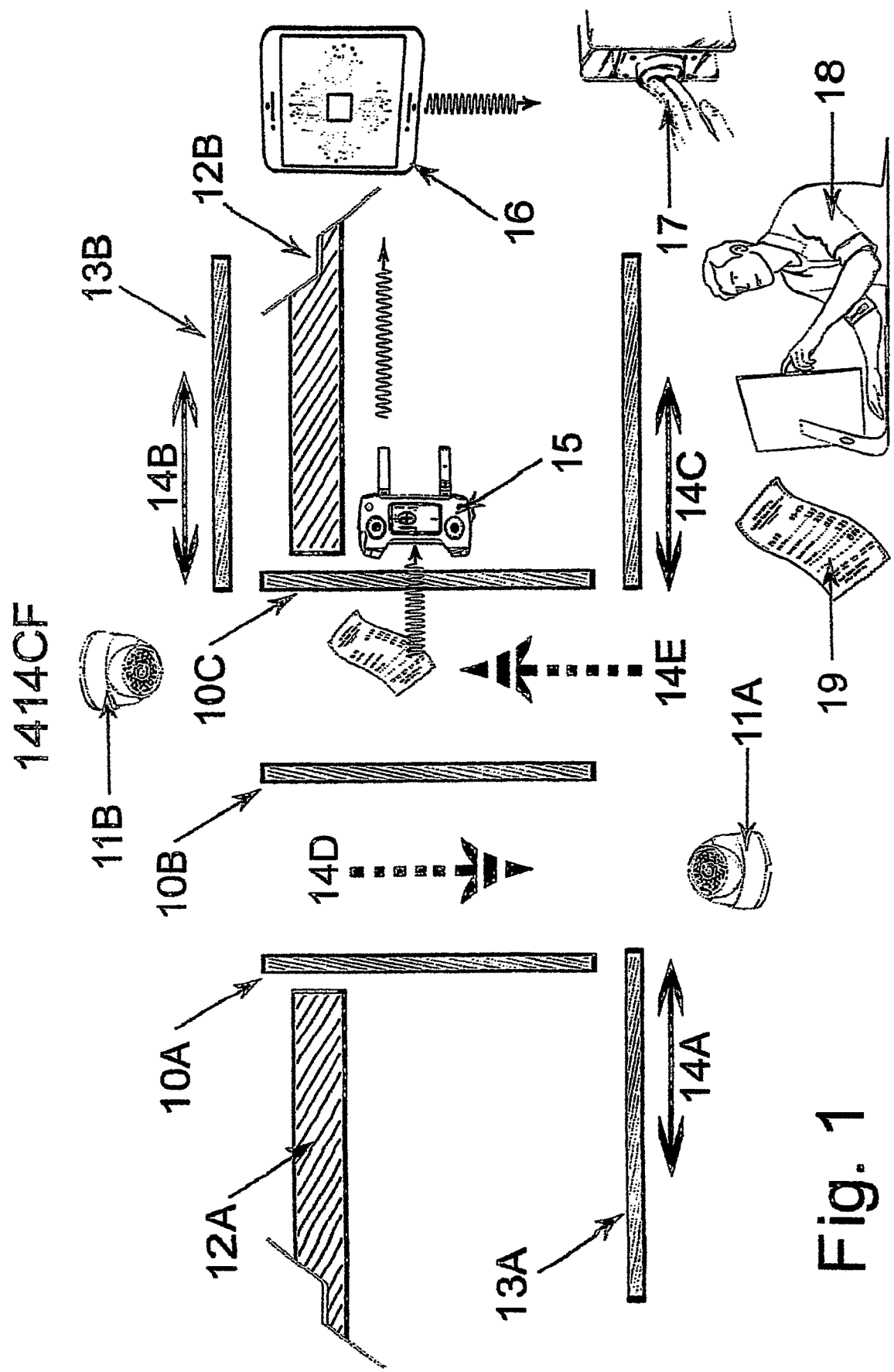
FIG. 1 is an overhead view of the preferred embodiment of the invention.

FIG. 1 is an overhead view of the preferred embodiment of the invention.

An opening between exterior walls 12A and 12B is used for ingress and egress from the store. Positioned in this opening, are panels 10A, 10B, and 10C which form two channels, one for ingress and one for egress from the store.

For egress, the customer (not shown) has obtained receipt 19 from the cash register 18. Barrier 13B has been moved to block egress as the customer passes as indicated by arrow 14E. Using receipt 19, the customer presents receipt 19 to reader 15 (positioned near a window on panel 10C). Reader 15, communicates with controller 16 which identifies the proper code (or lack thereof) and selectively move barrier 13B as indicated by arrow 14B. In this manner, a valid customer is given free access to leave the store while a shoplifter (without a receipt) is thwarted in their endeavors.

Camera 11B captures an image of the customer and communicates this image to the controller which may use facial recognition to identify the customer.

Emergency switch 17, ideally positioned near register 18, permits a store employee to cause all barriers to open in case of an emergency so that egress from the store is not hindered.

For ingress into the store, the customer enters between panels 10A and 10B as indicated by arrow 14D. As with egress, a camera 11A is used to capture an image of the entering customer for storage by controller 16 (possibly with facial recognition). Barrier 13A is typically left open but in some necessary situations, such as when the facial recognition identifies a previous thief, moves barrier 13A as indicated by arrow 14A to prevent entry.

Barriers 13A and 13B in this illustration are full or substantially full doors that slide (as indicated by arrows 14A, 14B, and 14C) to either open or close.

FIGS. 2A and 2B are views of the entry and exit portals.

Referring to FIG. 2A, the egress portion of the invention, looking as the customer would see the egress portion as they approach, are panels 10B and 10C forming a channel therebetween. Barrier 21B (an arm in this illustration) moves downward to block egress. The customer's image is captured by camera 11B. To move arm 21B, the customer presents his receipt to reader 15 which, if the proper code exists on the receipt, lifts arm 21B as indicated by arrow 22B.

The ode is ideally unique at least to the date and preferably to the individual purchase receipt.

The store's worker may also raise arm 21B should the need arise such as when the customer has not bought anything and then does not have a receipt, although in this situation, a "blank" receipt may be printed for the purpose of allowing egress.

FIG. 2B illustrates the ingress portion as seen by the customer seeking to enter the store between panels 10A and 10B. Camera 11A captures an image of the customer and, in one embodiment, performs facial recognition on the image to identify if the customer is someone that the store does not want to grant entry such as a former shoplifter, a writer of bad checks, has previously caused a disturbance in the store, or has used a fraudulent credit card in the past.

If the customer is a non-desirable, then arm 21A moves as indicated by arrow 22A to block entry and ideally a notice is displayed on screen 23. Screen 23 is also used to promote different sales items or for informational purposes such as hours of operation.

FIG. 3 is an informational flow diagram of the preferred embodiment of the invention.

Controller 16 receives the images from cameras 11A and 11B, performs facial recognition, and communicates the facial recognition data to data storage 30. Data storage 30 is used to identify customers who are undesirable as well as valued customers.

Controller 16 also communicates with the customer via screen 23 and opens/closes entry door 14A and exit door 14B.

Figure 4A:
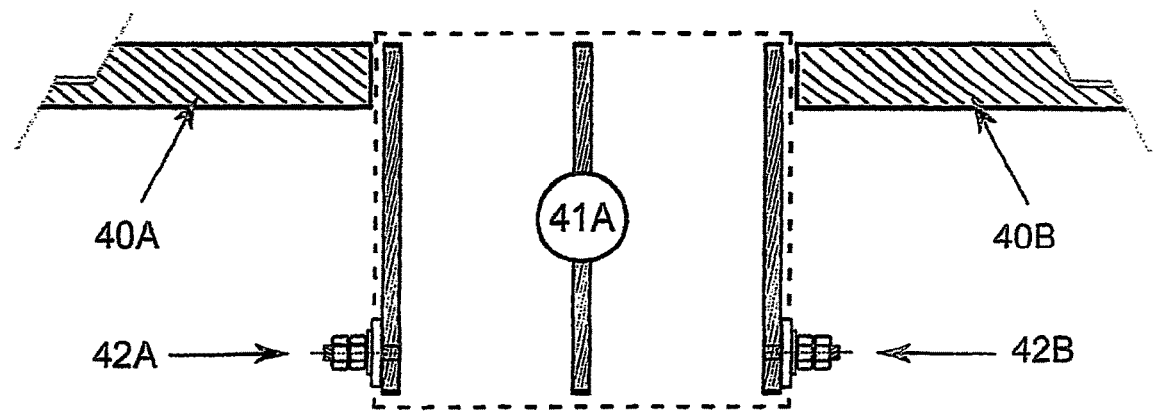
FIGS. 4A and 4B illustrate the movement of the entry/exit in an embodiment of the invention.
Figure 4A:
Figure 4B:
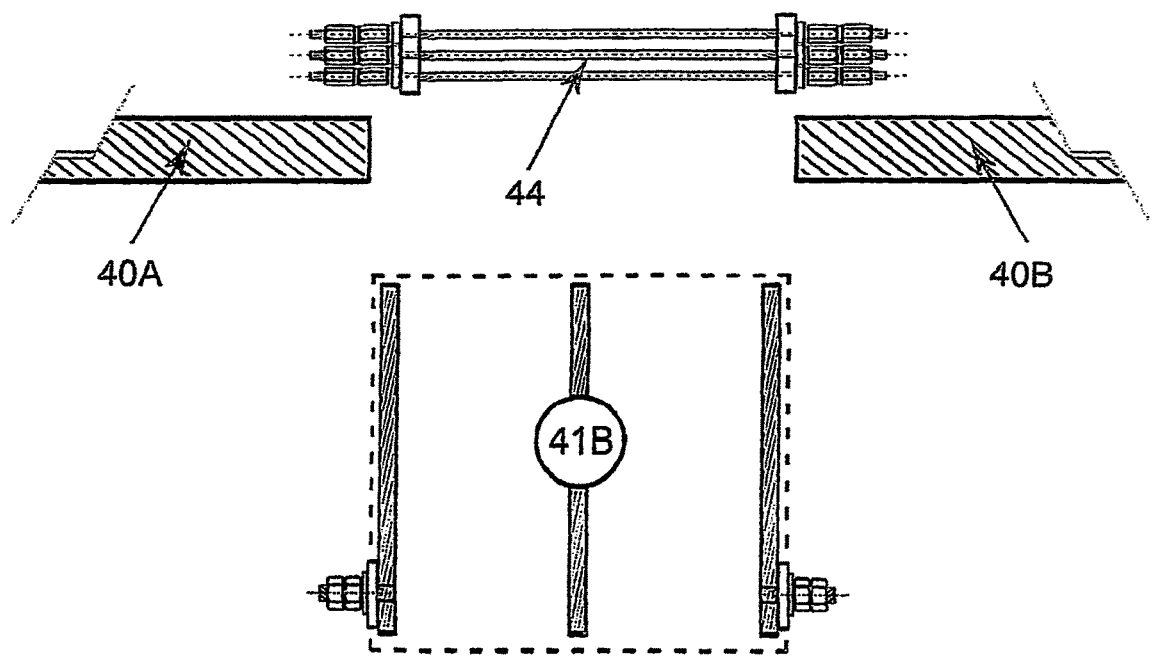

FIGS. 4A and 4B illustrate the movement of the entry/exit in an embodiment of the invention.

When the store is open for business, ingress/egress mechanism 41, as outlined above, is positioned between walls 40A and 40B. In this embodiment, ingress/egress mechanism 41 is a unified body. Latching bolts 42A and 42B are used to secure ingress/egress mechanism 41 in the position shown in FIG. 4A.

At store closing, FIG. 4B, the latching bolts 42A and 42B are released and the ingress/egress mechanism 41B, supported by wheels not shown, is pulled or rolled into the store and a rolling or security shutter/door 44 is used to securely cover the opening between wall 40A and 40B.

Figure 5:
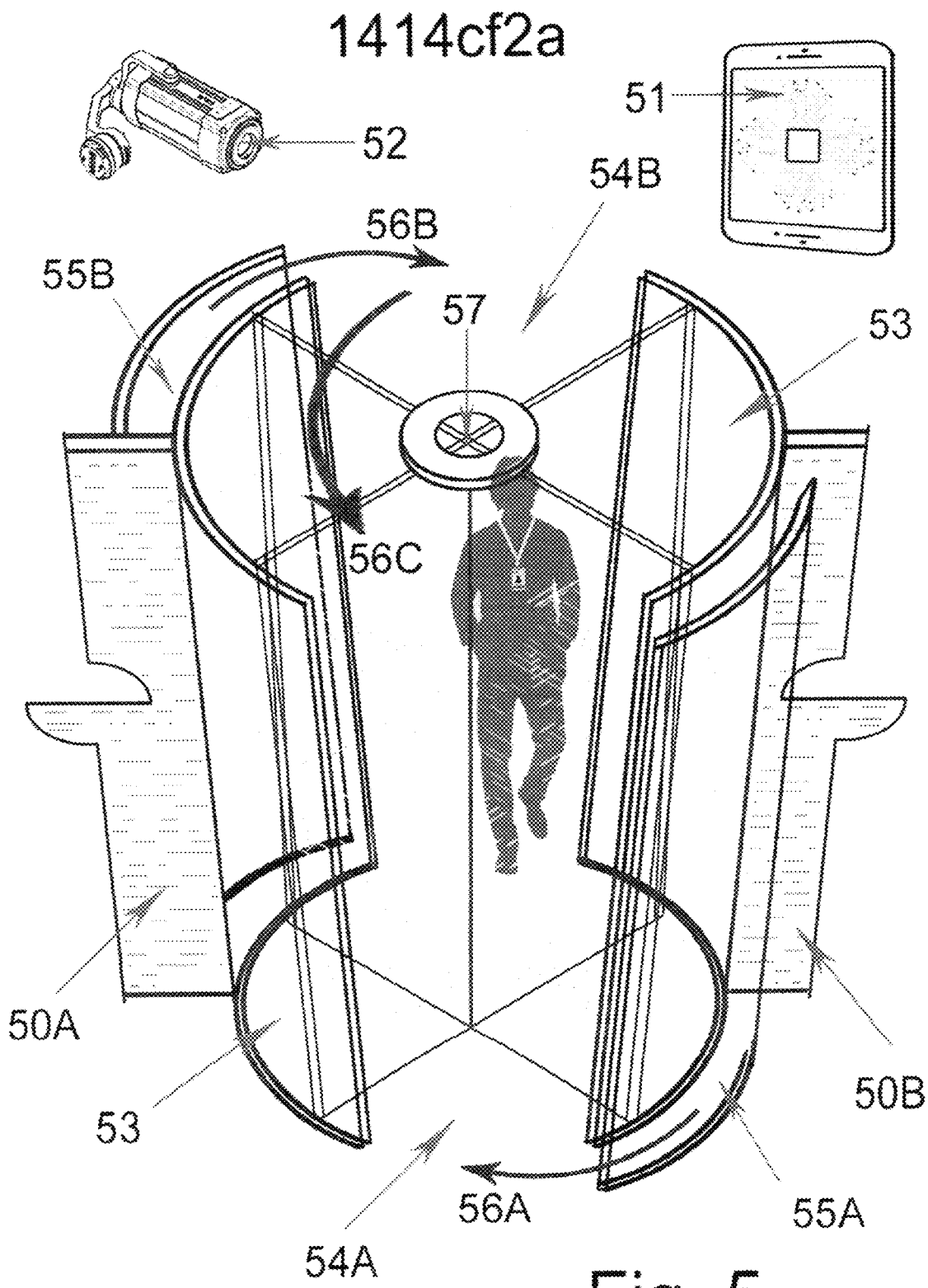
FIG. 5 is a top view of an embodiment of the ingress/egress revolving door.

FIG. 5 is a top view of an embodiment of the ingress/egress revolving door. The revolving doorway of this embodiment consists of frame 53, spine/blades 57. The revolving doorway permits a user to enter via exterior port 54B, and then enter via port 54A. The revolving doorway is constructed within walls 50A and 50B.

An interior barrier 55A is positioned to selectively close the interior port 54A as indicted by arrow 54A. Interior barrier 55A is closed by controller 51.

A locking mechanism (not shown) is located at the top of spine 57, keeps the revolving door from revolving so as to keep patrons from entering or leaving the retail store. Controller 51 selectively engages the locking mechanism.

An entry camera 52 is directed to an occupant entering the revolving doorway. Entry camera 52 generates an electronic image of the occupant and communicates this image to the controller 51. Controller 51 has access to a data base of facial data which ideally contain individuals who are to be turned away from the retail store. The facial recognition system within controller 51 is adapted to analyze the electronic image from the entry camera 52 and compare the electronic image against the data base of facial data to generate an acceptance indica. Based on this acceptance indica, controller 51 selectively closes the interior barrier 55A and in some embodiments engages the locking mechanism on revolving door 57.

An exterior barrier 55B is also closed as indicated by arrows 56B to either provide further restriction for the would-be patron, or for closure at the end of the work day.

Controller 51 is also receptive to alarms such as theft and fire as outlined above. When controller 51 receives a theft alarm, controller 51 closes the interior barrier. This closure is optionally overridden when an emergency vehicle sensor identifies an emergency vehicle (i.e. a police vehicle) proximate to the retail store when the theft alarm has been triggered. In this situation, the controller 51 assures the interior barrier 55A is in an unlocked status and the locking mechanism is disengaged.

In the preferred embodiment, the theft alarm includes the sound sensor sensing a breaking of glass sound.

To further curtail thefts, when a theft is sensed, strobing light 58 makes it difficult to navigate the revolving door.

FIGS. 6A, 6B, and 6C illustrate the preferred embodiment of the collapsing revolving door.

The revolving door includes a central spine 64, a motor (in some embodiments, but now shown here) turning the central spine 64, blades 62A, 62B, and 62C, all contained within walls 60A and 60B. Blade 62A is rigidly attached to spine 64. Blades 62B and 62C are detachable/releasable from central spine 64 in that they do not extend at a rigid angle.

When the controller (not shown) senses a fire alarm signal), blades 62B and 62C are released from the central spine (as shown in FIG. 6B). Central spine 64 continues to rotate causing blade 62A, to engage the detached blades 62B and 62C, to "sweep" these blades to a position (FIG. 6C) so that an unobstructed pathway 66 is created allowing the occupants of the retail store to move to safety from the retail store.

It is clear that the present invention provides for additional security from shoplifting.

What is claimed is:

1. An ingress/egress doorway for a retail store comprising:
   a) a revolving doorway permitting ingress into a retail store via an exterior port and an interior port;
   b) an interior barrier positioned to selectively close the interior port; and,
   c) a controller selectively closing the interior barrier;
   d) an entry camera directed to an occupant of the revolving doorway and generating an electronic image thereof; and,
   e) wherein the controller includes:
      1) access to a data base of facial data,
      2) a facial recognition system adapted to compare the electronic image from the entry camera with the electronic images within the data base of facial data and generate an acceptance indicia therefrom, and, 3) wherein, in response to the acceptance indicia, said controller selectively closes the interior barrier.

2. The ingress/egress doorway for a retail store, according to claim 1,
   a) further including a locking mechanism selectively keeping the revolving door from revolving; and,
   b) wherein the controller selectively engages the locking mechanism.

3. The ingress/egress doorway for a retail store according to claim 2, wherein the controller in response to the acceptance indicia, selectively engages the locking mechanism.

4. The ingress/egress doorway for a retail store according to claim 3, further including an exterior barrier configured to selectively close the exterior port.

5. The ingress/egress doorway for a retail store according to claim 2:
   a) further including a theft alarm mechanism generating a theft signal, which, when activated, said controller selectively closes the interior barrier;
   b) further including an emergency vehicle sensor generating an emergency vehicle signal when an emergency vehicle is located proximate to the store; and,
   c) wherein, once the emergency vehicle signal has been activated and the theft signal mechanism has been activated, the controller assures the interior barrier is in an unlocked status and the locking mechanism is disengaged.

6. The ingress/egress doorway for a retail store according to claim 5,
   a) wherein the theft alarm mechanism includes a sound sensor activated by a breaking of glass sound; and,
   b) wherein the controller places the exit door in a locked status in response to the theft signal.

7. The ingress/egress doorway for a retail store according to claim 6, further including a strobing light mechanism being responsive to the theft signal, said strobing light mechanism being directed towards an interior of the revolving doorway.

8. The ingress/egress doorway for a retail store according to claim 1, wherein the revolving doorway further includes:
   a) a central spine;
   b) a motor selectively turning the central spine;
   c) at least three blades extending from the central spine, at least one blade being rigidly affixed to the central spine, a remaining number of the at least three blades being selectively disengagable from the central spine; and,
   d) wherein, upon sensing a signal from a fire alarm, said controller,
      1) causes the remaining number of the at least three blades to disengage from the central spine, and,
      2) causes the motor to rotate the central spine such that the at least one blade being rigidly affixed to the central spine, sweeps the remaining number of the at least three blades to a position to create an unobstructed egress via the revolving doorway.

9. A security doorway for a retail store comprising:
   a) a revolving doorway having,
      1) a central spine,
      2) a motor selectively turning the central spine;
      3) at least three blades extending from the central spine, a first blade being permanently affixed to the central spine, a second and third blade being selectively engaged with the central spine; and,
   b) a controller, upon sensing a signal from a fire alarm, said controller causes,
      1) causes the second and third blades to disengage from the central spine, and,
      2) causes the motor to rotate the central spine such that the first blade sweeps the second and third blades to a position creating an unobstructed egress from the retail store.

10. The security doorway for a retail store according to claim 9, further including, an interior barrier positioned to selectively prevent egress or ingress via the security doorway.

11. The security doorway for a retail store according to claim 10,
    a) further including a locking mechanism selectively stopping the central spine from revolving; and,
    b) wherein the controller selectively engages the locking mechanism.

12. The security doorway for a retail store according to claim 10,
    a) a theft sensor generating a theft alarm;
    b) an emergency vehicle sensor generating an emergency vehicle signal when an emergency vehicle is located proximate to the store; and,
    c) wherein, the controller, when both the theft alarm and the emergency vehicle signal are present, assures the interior barrier is in an unlocked status.

13. The security doorway for a retail store according claim 12, wherein the theft alarm is responsive to a sound of a breaking of glass.

14. An ingress/egress doorway for a retail store comprising:
    a) a revolving doorway permitting ingress into a retail store through an exterior port and through an interior port, said revolving doorway having, a central spine being rotated by a motor, and, at least three blades extending from the central spine, a first blade being permanently affixed to the central spine, a second and third blade being selectively engaged to the central spine; and,
    b) an interior barrier positioned to selectively close the interior port; and,
    c) a controller controlling the interior barrier, the motor, and attachment of the second and third blades.

15. The ingress/egress doorway for a retail store according to claim 14, wherein, upon sensing a signal from a fire alarm, said controller,
    1) causes the second and third blades to disengage from the central spine; and,
    2) causes the motor to rotate the central spine such that the first blade moves the second and third blades to a position to create an unobstructed egress through the interior port and the exterior port.

16. The ingress/egress doorway for a retail store according to claim 14,
    a) further including a theft alarm mechanism;
    b) wherein the controller, when the theft alarm is activated, selectively closes the interior barrier,
    c) further including the emergency vehicle sensor generating an emergency vehicle signal when an emergency vehicle is located proximate to the retail store; and,
    d) wherein, the controller, in response to the emergency vehicle signal, assures the interior barrier is in an unlocked status and the locking mechanism is disengaged.

17. The ingress/egress doorway for a retail store according to claim 16, wherein the theft alarm mechanism includes a sound sensor generating an emergency signal upon sensing a breaking of glass sound.

* * * * *